United States Patent [19]
Burkhardt

[11] Patent Number: 6,062,266
[45] Date of Patent: May 16, 2000

[54] MULTIBELLOWS ELEMENT

[75] Inventor: Carlo Burkhardt, Grunbach, Germany

[73] Assignee: Witzenmann GmbH Metallschlauch-Fabrik Pforzheim, Pforzheim, Germany

[21] Appl. No.: 09/087,853

[22] Filed: Jun. 1, 1998

[30] Foreign Application Priority Data

May 30, 1997 [DE] Germany ............... 197 22 603

[51] Int. Cl.[7] ............................................. F16L 9/18
[52] U.S. Cl. ................... 138/114; 138/118; 138/116; 138/121; 138/142; 138/143; 138/148
[58] Field of Search ............... 138/110, 114, 138/116, 117, 118, 121, 148, 127, 142, 143

[56] References Cited

U.S. PATENT DOCUMENTS

| | | | |
|---|---|---|---|
| 2,934,095 | 4/1960 | Lockhart | 138/121 |
| 3,420,553 | 1/1969 | Poxon et al. | 138/121 |
| 3,549,176 | 12/1970 | Contreras | 138/121 |
| 3,731,711 | 5/1973 | Bauer | 138/121 |
| 3,773,087 | 11/1973 | Katayama | 138/121 |
| 3,945,803 | 3/1976 | Musall et al. | 138/108 |
| 3,947,252 | 3/1976 | Musall et al. | 138/108 |
| 4,013,099 | 3/1977 | Gerigk et al. | 138/118.1 |
| 4,315,558 | 2/1982 | Katayama | 138/121 |
| 4,637,637 | 1/1987 | Adorjan | 138/121 |
| 5,456,291 | 10/1995 | Kunzmann | 138/110 |
| 5,813,438 | 9/1998 | Reed | 138/118 |
| 5,901,754 | 5/1999 | Elässer et al. | 138/118 |

FOREIGN PATENT DOCUMENTS

| | | |
|---|---|---|
| 0441625A1 | 8/1991 | European Pat. Off. |
| 0750100A1 | 12/1996 | European Pat. Off. |
| 2425604 | 12/1979 | France |
| 2641054 | 6/1990 | France |
| 2723421 | 2/1996 | France |
| 528415 | 6/1931 | Germany |
| 296 05 418 U1 | 3/1996 | Germany |

Primary Examiner—James Hook
Attorney, Agent, or Firm—Venable; George H. Spencer; Catherine M. Voorhees

[57] ABSTRACT

A tube element, especially for the exhaust systems and exhaust gas recirculation systems of combustion engines in vehicles. The element has a single- or multi-ply tube element made of metal which is provided with cylindrical end fittings and at least two annularly corrugated bellows and a connecting pipe forming a single element, with the pipe corresponding with the bellows in diameter as well as in wall thickness, and with the inside diameter of the connecting pipe corresponding substantially with the free inside diameter of the adjacent bellows. The element has a concentric reinforcing pipe at an external radial distance to the connecting pipe, with the ends of the reinforcing pipe, whose inside diameter corresponds with the outside diameter of the bellows, being connected with the radial outward crests of the first corrugations of the bellows following the connecting pipe.

18 Claims, 6 Drawing Sheets

MULTIBELLOWS ELEMENT

CROSS-REFERENCE TO RELATED APPLICATION

This application claims the priority of German Application 197 22 603.5 filed May 30, 1997, the subject matter of which is incorporated herein by reference.

BACKGROUND OF THE INVENTION

The present invention was made for the purpose of constructing a tube element, especially for exhaust systems and exhaust gas recirculation systems of combustion engines in vehicles. This element consist of a single or multi-ply tube element made of metal which is equipped with cylindrical end fittings and at least two annularly corrugated bellows and a connecting pipe forming a single element, with the pipe corresponding with the bellows in diameter as well as in wall thickness, and with the inside diameter of the connecting pipe corresponding substantially with the free inside diameter of the adjacent bellows.

Such a tube element is used as a universal expansion joint within the pipe system into which it is installed due to its capability of compensating interacting lateral movements as well as angular movements and axial movements of the individual sections which are connected by the tube element. Usually, this tube element is made of metal, perhaps stainless steel, especially for use in automotive engine manufacturing. Tube elements made of non-metal material, especially of an appropriate type of plastic material, are a potential alternative for other applications.

As mentioned before, the tube element can be made of single-ply material. Depending on the individual circumstances, multi-ply material could be an alternative to increase the flexibility of the bellows, or layers of different materials may be used because of their resistance to certain stress factors such as chemical, thermal or mechanical stress.

In the traditional versions of such a tube element, the connecting pipe, which is connected with the bellows e.g. by welding, consists of material whose wall thickness is higher than that of the bellows, so that the connecting pipe is able to resist the stress to which it is subject. Due to the resulting weight of the connecting pipe and the relatively soft material of the connected bellows, this pipe will act as a vibrating element which is to be adapted to the individual application by very expensive measures, using solid compensating elements. Furthermore, the weld seams will increase both the manufacturing costs and the weight of the element.

As an attempt to avoid these problems, bellows with intermediate plain sections, i.e. single-element parts, were used. This object, however, caused the problem of a low mechanical resistance which is insufficient for many applications.

SUMMARY OF THE INVENTION

The object of the present invention is the provision of a new type of tube element to eliminate both problems described above by economical additional measures, and this object is achieved according to the present invention by a connecting pipe equipped with a concentric reinforcing pipe at an external radial distance and connecting the ends of the reinforcing pipe whose inside diameter corresponds with the outside diameter of the bellows with the radial external crests of the first bellows corrugations following the connecting pipe.

These features allow the simultaneous manufacturing of an assembly consisting of bellows and connecting pipe as a single-element component from one single type of basic material, thus avoiding weld seams between the bellows and the connecting pipe which would make high demands on the technical staff due to the high requirements made on these parts in respect to resistance and tightness as well as to the adaptation to the different cross-sections.

On the other hand, the reinforcing pipe will guarantee the mechanical stability which is required in the zone of the connecting pipe. There are no high material requirements for the reinforcing pipe nor for the tightness of the connection between its ends with the corresponding bellows corrugations which can therefore be carried out in an easy and economical process.

All these factors allow the easy and economical manufacturing of a part which is able to comply with high tightness and vibration decoupling requirements.

The reinforcing pipe can be made of metal. Even with a tube element made of metal, however, there is the possibility of using a reinforcing pipe which is, for example, made of an appropriate plastic material, since the reinforcing pipe is not exposed to the fluid within the tube element and is insulated from potential thermal stress by its radial distance to the connecting pipe.

If desired, the crests of the bellows which are required for the connection with the reinforcing pipe may be flattened, thus forming a section whose outlines are parallel to the bellows axis and whose outside diameter corresponds with the inside diameter of the ends of the reinforcing pipe. The resulting cylindrical support areas on the exterior surface of the corrugations in question allow an easy connection with the ends of the reinforcing pipe with a wide range of permissible tolerances in respect to the length of the reinforcing pipe.

In practice, the reinforcing pipe is installed by pushing it onto the finished tube element.

There are different possible ways of connecting the ends of the reinforcing pipe with the corresponding corrugation crests, depending on the individual requirements. A reinforcing pipe made of plastic material can be fixed by using an appropriate adhesive. Welding is an appropriate connecting method for many versions consisting of metal parts. In such cases, it is not necessary to produce a continuous weld seam. A connection which consists of a number of welding spots distributed over the circumference should be sufficient.

On the other hand, one can connect the ends of the reinforcing pipe with the corrugation crests by means of rolling and/or pressing them together.

The easiest process is the connection in which the connecting pipe and/or the reinforcing pipe have plain walls. There is, however, also the possibility of using a connecting pipe and/or a reinforcing pipe with a profiled surface formed by longitudinal and/or lateral and/or diagonal stiffening corrugations in order to increase the stability and the natural frequency of the pipe. It is appropriate to use pipes with stiffening corrugations in radial outward direction.

The present invention provides the advantage of filling the toroidal cavity between the connecting pipe and the reinforcing pipe with temperature-resistant substances for the purpose of vibration damping or thermal insulation, since the space exists anyway. On the other hand, these substances are enclosed and thus protected from exterior influences, so that even substances with low inherent resistance or low resistance to exterior influences can be used.

Other possibilities of vibration damping or thermal insulation are formed parts consisting of an exterior metal wire mesh, metal braiding or metal fiber sheets of irregular structure, of ceramic fleece or cellular plastic, according to the most appropriate way of avoiding undesirable vibrations or heat losses.

Formed parts which do not fill the whole toroidal cavity can be held in place by the profile of the connecting pipe and/or of the reinforcing pipe.

Within the range of designs discussed in the foregoing text, it can be appropriate to manufacture the tube element made of a material of at least triple-plies, with one of the intermediate plies consisting of heat-insulating and/or vibration-damping material. This individual or additional measure allows an appropriate design of the complete tube element in respect to the avoidance of thermal radiation or of resonant vibrations. In this design, the intermediate ply is protected from exterior mechanical influences and can be installed simultaneously with the exterior ply of the tube element. Furthermore, it can be formed simultaneously with the forming of the tube element.

Another possibility is a traditional design in which the bellows, and perhaps the reinforcing pipe, too, are equipped with a metal wire braiding or metal wire mesh, and the ends of the braiding or the mesh are fixed at the free ends of the bellows and perhaps at the ends of the reinforcing pipe. In this design, the hose ends can be held by supporting rings and can be fixed together with them at the free ends of the bellows or at the ends of the reinforcing pipe by means of a connecting method in which the hose ends can, for example, be welded to the tube element together with the supporting rings. Such a braiding or wire mesh is able to resist a tendency of the tube element to elongation due to internal pressurization. Furthermore, it protects the element from exterior mechanical influences and also reduces vibrations.

Furthermore, the installation of a guide, being a braiding hose of metal wire, a hose with interlocked profile or an internal sleeve, for the conveyance of the fluid in the tube element can be provided. This guide spans over at least a part of the length of the tube element, and at least one of its ends is fixed at one end of the tube element. This already known procedure allows a smoother flow of the fluid in the tube element and also the damping of vibrations and the protection of the interior wall of the tube element, especially from high temperatures.

If the subject of this invention is used within the exhaust systems of a combustion engine in a vehicle which is equipped with a catalytic converter, or in a vehicle with a diesel engine with particle or soot filter, there is the possibility of installing a catalytic preconverter, a particle filter or a soot filter in the connecting pipe. If a catalytic preconverter is installed, the connecting pipe can be equipped with extremely good thermal insulation in the way already described in order to allow or support the function of the catalytic preconverter.

DESCRIPTION OF THE PREFERRED EMBODIMENTS

Figure 1:
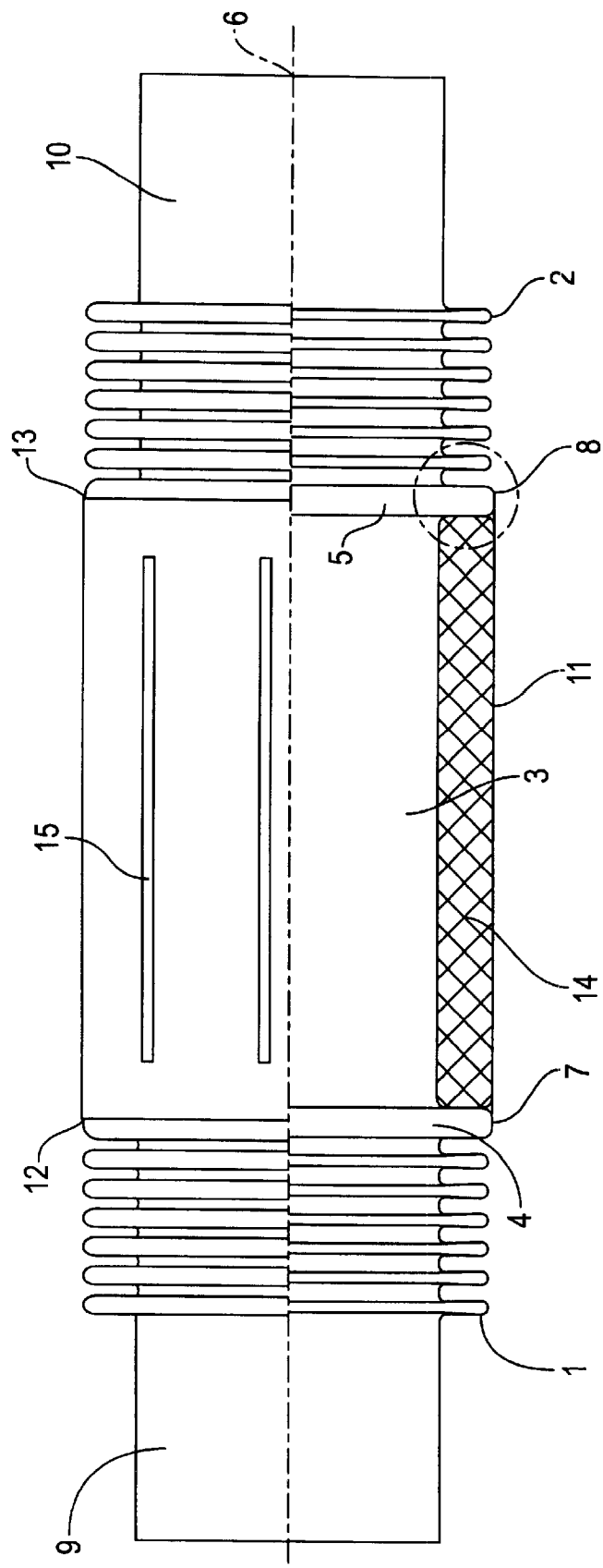
FIG. 1 shows a basic version of the tube element according to the present invention, partly in an axial view.

The tube metal element shown in FIG. 1 is equipped with a single-element tube part consisting of two annularly corrugated bellows 1, 2, with an intermediate connecting pipe. This pipe protrudes from the two opposite flanks of the bellows corrugations 4, 5 adjacent to the connecting pipe 3. The crests of the bellows corrugations 4, 5 have a flattened cylindrical section 7, 8 parallel to the bellows axis 6, with the outside diameter of this section equal to the outside diameter of the other bellows corrugations.

The tube element described before is equipped with cylindrical end fittings 9, 10 formed by the free ends of the bellows 1, 2, which are connected with further components of the system, e.g. with an automotive exhaust system, which are not included in the drawing, by means of welding or a snap-on connection.

A support pipe 11 is pushed onto the tube element, and is held in a position longitudinally symmetrical to the connecting pipe 3, as shown in the drawing. The inside diameter of the support pipe 11 is equal to the outside diameter of the bellows 1, 2. The support pipe 11 is fixed at the bellows corrugations 4, 5, by connecting the ends of the support pipe with the cylindrical sections 7, 8 with weld seams 12, 13. Instead of such continuous weld seams 12, 13, short weld seam sections or individual welding spots which are distributed symmetrically around the circumference can be used. An insert of heat-insulating and vibration-damping material 14 is placed into the toroidal chamber formed by the connecting pipe 3 and the support pipe 11. This material practically fills the whole chamber and is used for the damping of the vibrations in the connecting pipe 3. Furthermore, the reinforcing pipe 11 has longitudinal stiffening corrugations 15 in a radial outward position and parallel to axis 6, which provide an increase in both the rigidity and the load-bearing capacity of the reinforcing pipe. The insert 14 can be placed onto the blanks before the bellows 1, 2 are finally formed from these blanks, if it consists of a self-supporting hollow cylinder. There is, however, also the possibility of manufacturing an insert from two half shells which are placed onto the connecting pipe 3 before the same is done with the reinforcing pipe after the tube element, which consists of the bellows 1, 2 and the connecting pipe 3, has been finished. Finally, the insert can be made of another material, usually strips, which is coiled onto the connecting pipe 3 before the reinforcing pipe 11 is put into place.

FIGS. 2 to 6 show variants of the item presented in FIG. 1. These variants correspond with the basic version in their design principle of which the reference numbers referred to above are also used with these embodiments.

Figure 2:
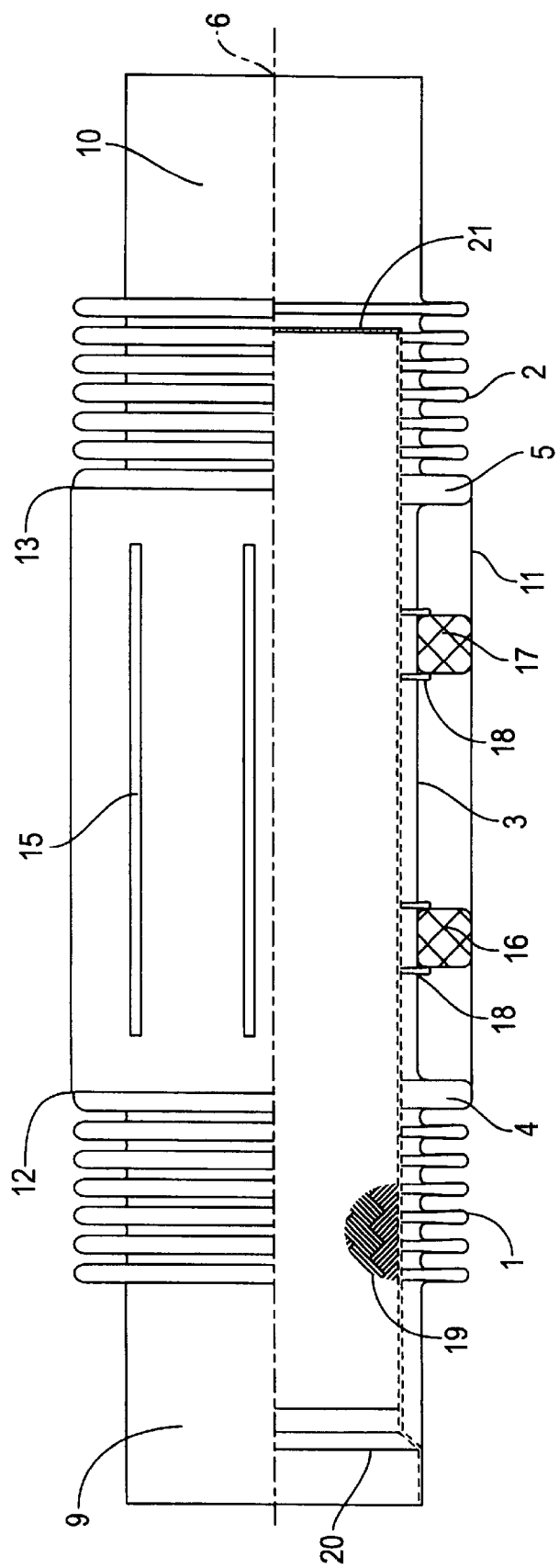
FIGS. 2 to 6 are variants of the tube element according to FIG. 1.

In comparison to the embodiment according to FIG. 1, the embodiment according to FIG. 2 is equipped with an insert consisting of, for example, two rings 16, 17, each of them made of two halves, with an axial distance between one ring and the other and also between the individual ring and the adjacent bellows corrugations 4, 5. In order to avoid an axial displacement of the rings 16, 17 during operation, annular stiffening corrugations 18 protruding in a radial outward direction have been formed in the connecting pipe 3. The rings 16, 17 are fixed in the space between two stiffening corrugations. The main purpose of the insert consisting of the rings 16, 17 is the damping of vibrations. Furthermore, a hose 19 made of a metal wire braiding is inserted into the interior of the tube element 1, 2, 3. The outside diameter of this pipe, which is installed to provide a maximum smoothness for the flow of the medium in the tube element, is slightly less than the inside diameter of the bellows 1, 2 and the connecting pipe 3.

According to FIG. 2, the left end 20 of the hose 19 is fixed to the end fitting 9 by, for example, welding, whereas its right end 21 is free within the right end zone of the bellows 2. The medium will flow from left to right in an element based on this principle.

Figure 3:
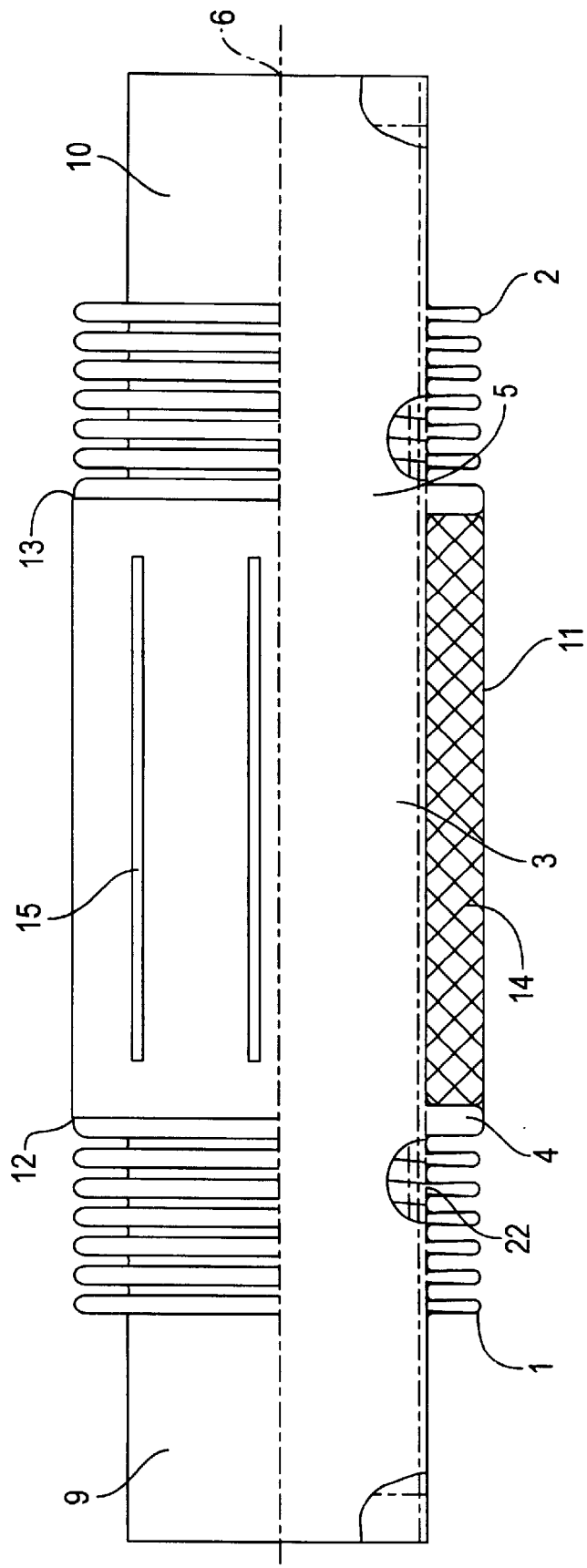

The embodiment according to FIG. 3 also corresponds with the embodiment according to FIG. 1, except that it is equipped with an interior liner which, in this case, consists of a helically stripwound metal hose with interlocked profile 22. Both ends of this hose with interlocked profile 22 are fixed to the end fittings 9, 10 by, for example, welding, with the ends of the hose with interlocked profile 22 being expanded in a radial direction, since the outside diameter of the hose with interlocked profile 22 is less than the inside diameter of the tube element.

Figure 4:
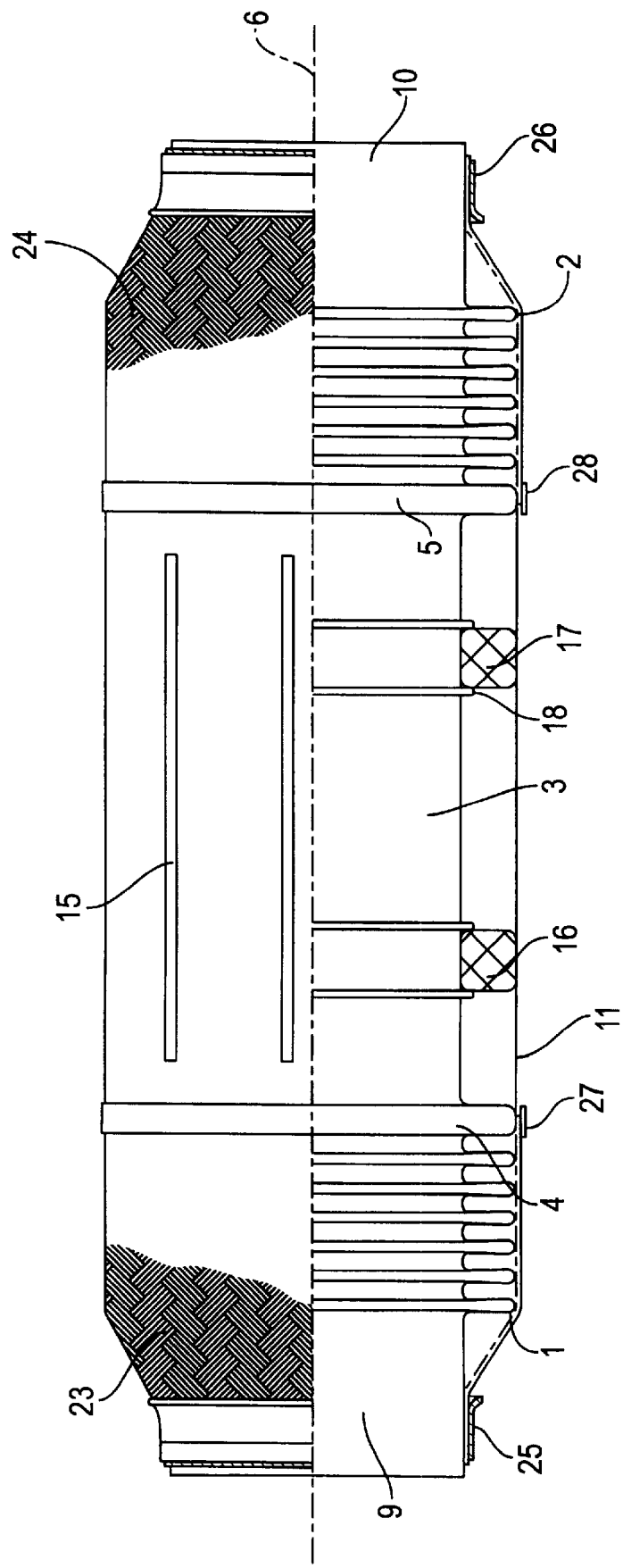

The embodiment according to FIG. 4 corresponds in general with the embodiment according to FIG. 2, with the difference, however, that it is not equipped with an interior braiding hose 19 as the embodiment according to FIG. 2, which is in this embodiment, replaced by exterior hoses 22, 23 made of metal wire braiding, which cover the bellows 2, 3. The ends of the braiding hoses 23, 24 are, at one end, fixed to the bellows ends 9, 10 by welding them to these ends together with the attached supporting rings 25, 26. At the other end, the braiding hoses 23, 24 are fixed in the zone of the reinforcing pipe 11 together with the attached supporting rings 27, 28, with the supporting rings 27, 28 being welded to the reinforcing pipe 11 or pressed onto it by a radial reduction of its diameter.

Figure 5:
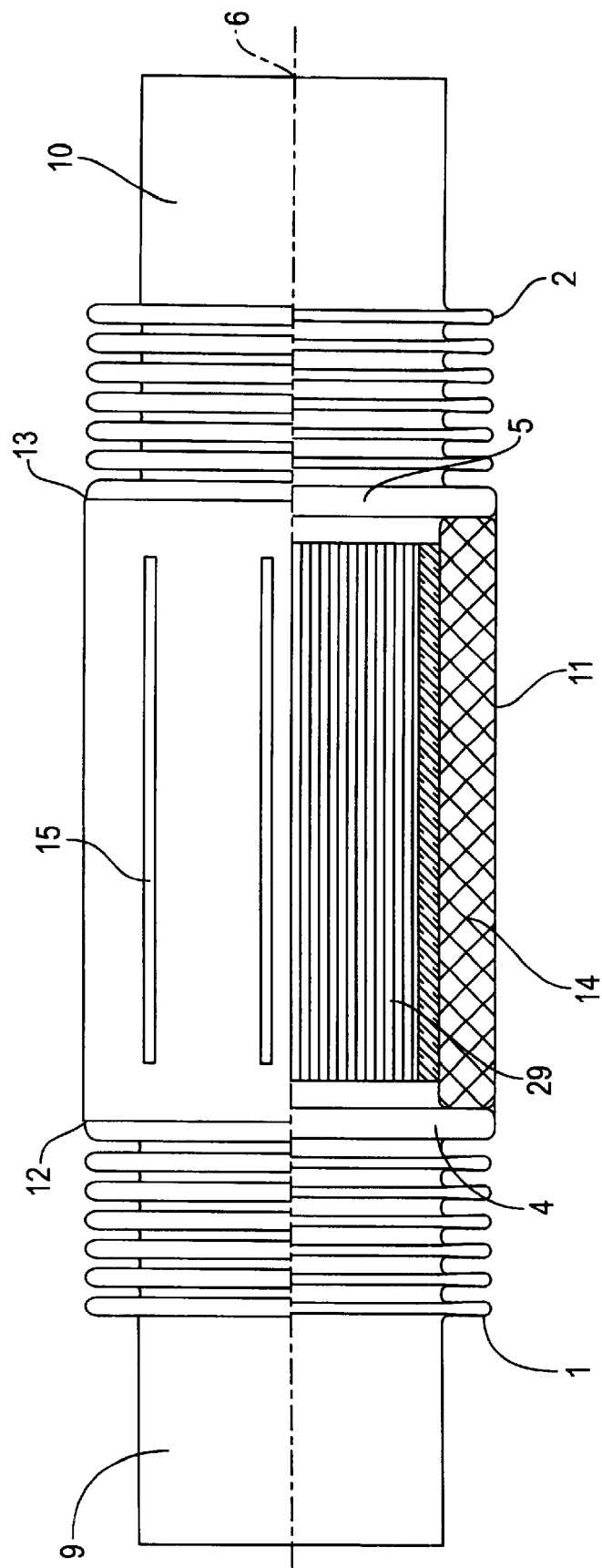

The embodiment according to FIG. 5 is based on the embodiment according to FIG. 1, which is, in this case, supplemented by a catalytic preconverter 29 which is installed and appropriately fixed to the connecting pipe 3.

Figure 6:
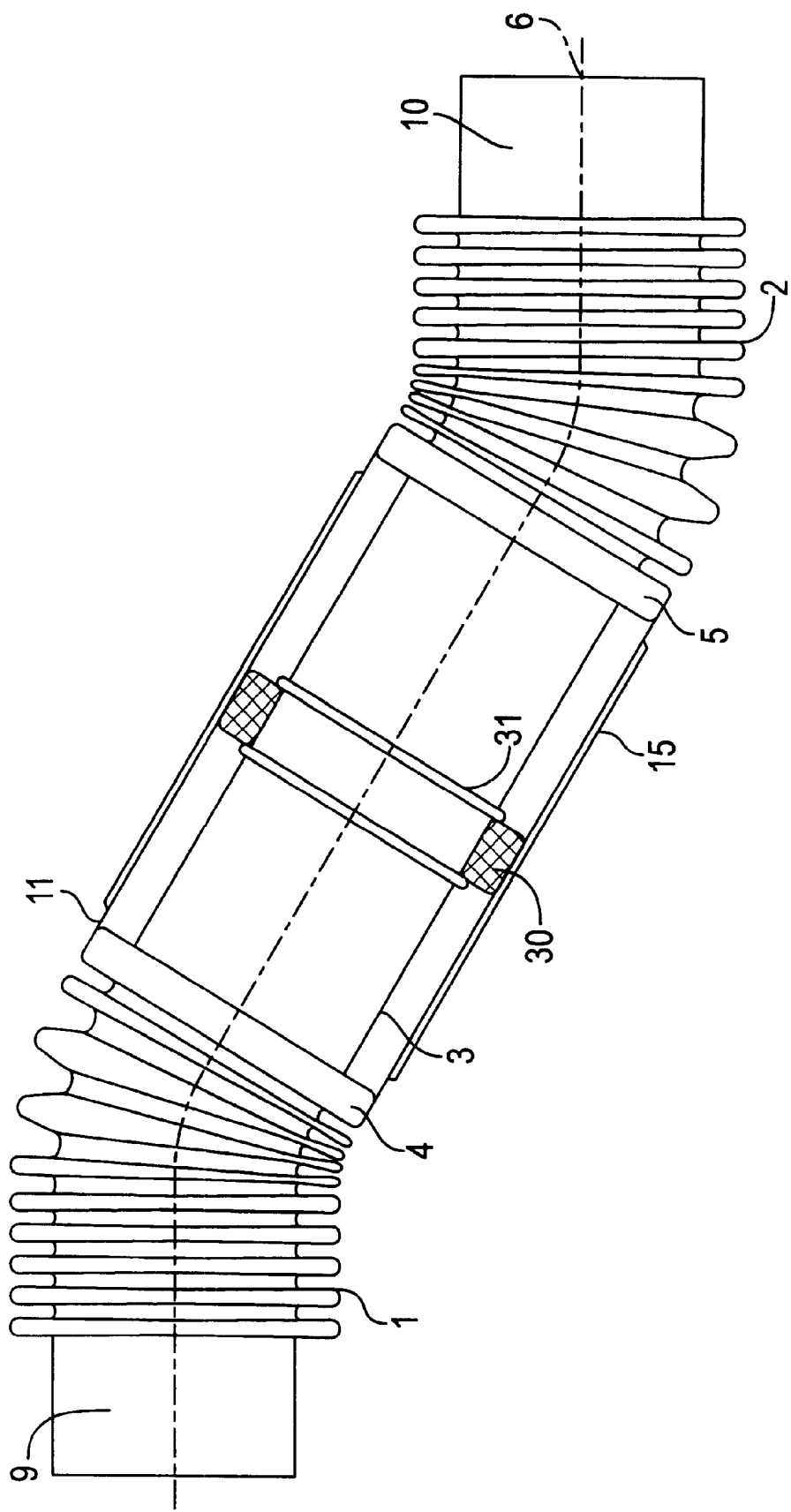

Finally, FIG. 6 shows a tube element according to the principle already described. In this embodiment, the connecting pipe 3 and the reinforcing pipe 11 form a toroidal cavity.

The only insert is a ring 30 in an axially central position. The main purpose of this insert is the damping of vibrations in the connecting pipe. Axial displacement of this insert is avoided by circumfering stiffening corrugations 31 in the connecting pipe 3, which will hold the insert in its position.

Furthermore, FIG. 6 shows the item already described in a state of lateral expansion, which may also occur during the operation or the installation of the other embodiments.

In all embodiments, the connecting pipe and the reinforcing pipe are straight, cylindrical pipes. Alternatively, curved or bent pipes or similar types may be used, depending on the individual installation conditions.

The present invention has been described with respect to various embodiments, it being apparent to those skilled in the art that changes and modifications may be made without departing from the essential aspects of the invention, and the appended claims are intended to cover all such changes and modifications as fall within the spirit of the invention.

What is claimed is:

1. A tube element for the exhaust systems and exhaust gas recirculation systems of combustion engines in vehicles, comprises a single- or multi-ply tube element made of metal having cylindrical end fittings and at least two annularly corrugated bellows and a connecting pipe forming a single element, with the pipe corresponding with the bellows in diameter as well as in wall thickness, and with the inside diameter of the connecting pipe corresponding substantially with the free inside diameter of the adjacent bellows, said tube element having a rigid, concentric reinforcing pipe at an external radial distance to the connecting pipe, the ends of the reinforcing pipe whose inside diameter corresponds with the outside diameter of the bellows being connected with the radial outward crests of the first corrugations of the bellows following the connecting pipe.

2. A tube element according to claim 1, wherein said reinforcing pipe is made of metal.

3. A tube element according to claim 1, wherein the corrugation crests used for the connection of the reinforcing pipe are flattened, forming a section parallel to the bellows axis, and the outside diameter of the sections corresponding with the inside diameter of the ends of the reinforcing pipe which are fixed to these sections.

4. A tube element according to claim 1, wherein the ends of the reinforcing pipe are connected with the corrugation crests by weld ends.

5. A tube element according to claim 1, wherein the ends of the reinforcing pipe are connected with the corrugation crests by rolling and/or pressing.

6. A tube element according to claim 1, wherein the connecting pipe and/or the reinforcing pipe have smooth surfaces.

7. A tube element according to claim 1, wherein the connecting pipe and/or the reinforcing pipe have profilated walls.

8. A tube element according to claim 7, wherein the profilation has longitudinal, lateral or diagonal stiffening corrugations.

9. A tube element according to claim 7, wherein the stiffening corrugations protrude in radial outward direction.

10. A tube element according to claim 1, wherein the toroidal chamber formed by the connecting pipe and the reinforcing pipe is filled with temperature-resistant parts for the damping of vibrations and/or for thermal insulation.

11. A tube element according to claim 10, wherein the inserts comprise formed parts made of metal wire mesh, metal braidings or metal fiber sheets of irregular structure, of ceramic fleece or cellular plastic.

12. A tube element according to claim 1, wherein said formed parts are supported by the profilation of the connecting pipe and/or the reinforcing pipe, thereby avoiding displacement of said formed parts.

13. A tube element according to claim 1, wherein the tube element is made of a material of at least triple-plies, with one of the intermediate plies comprising heat-insulating and/or vibration-damping material.

14. A tube element according to claim 1, wherein the bellows and/or the reinforcing pipe are equipped with a metal wire braiding or metal wire mesh, and the ends of the braiding or the mesh are fixed at the free ends of the bellows and/or at the ends of the reinforcing pipe.

15. A tube element according to claim 14, wherein the hose ends are held by supporting rings made of metal and are fixable together with them at the free ends of the bellows or at the ends of the reinforcing pipe.

16. A tube element according to claim 15, wherein the hose ends are fixed together with the supporting rings by a weld.

17. A tube element according to claim 1, wherein the tube has a guide in the form of a braiding hose of metal wire, a hose with interlocked profile, or an internal sleeve, for the conveyance of the fluid in the tube element, said guides spanning over at least a part of the length of the tube element and at least one of its ends being fixed at one end of the tube element.

18. A tube element according to claim 1, further comprising a catalytic preconverter, a particle filter or a soot filter in the connecting pipe.

* * * * *